United States Patent [19]

Kuga et al.

[11] Patent Number: 4,975,726
[45] Date of Patent: Dec. 4, 1990

[54] AUTOMATIC FOCUSING APPARATUS

[75] Inventors: Ryuichiro Kuga, Katano; Masayuki Yoneyama, Takatsuki; Teruyoshi Miura, Hirakata; Yoshiaki Hirao, Habikino, all of Japan

[73] Assignee: Matsushita Electric Industrial Co., Ltd., Osaka, Japan

[21] Appl. No.: 272,898

[22] Filed: Nov. 18, 1988

[51] Int. Cl.$^5$ ............................................. G03B 13/00
[52] U.S. Cl. ..................................... 354/402; 358/227
[58] Field of Search ............... 354/400, 402, 406, 407, 354/408; 358/227

[56] References Cited

U.S. PATENT DOCUMENTS 4,638,364  1/1987  Hiramatsu ............................ 354/402
4,768,052  8/1988  Hamada et al. ...................... 354/402

FOREIGN PATENT DOCUMENTS 0194162  9/1986  European Pat. Off. .
60-217759  4/1984  Japan .
63-178674  7/1988  Japan .

OTHER PUBLICATIONS

New Automatic Focusing System for Video Cameras, by: Hideo Toyoda, Syoji Nishikawa, Yoshinori Kitamura, Masami Onishi, Matsushita Electric Industrial Co., Ltd., 8/3/86.

Primary Examiner—L. T. Hix
Assistant Examiner—David M. Gray
Attorney, Agent, or Firm—Wenderoth, Lind & Ponack

[57] ABSTRACT

An automatic focusing apparatus uses an image signal provided by a lens system of a camera for focusing the taking lens system. The apparatus includes: a lens system; a pickup element for converting the optical image of an object formed by the lens system into a corresponding electric signal; a signal processing circuit which processes the output signal of the pickup element to provide two focus signals corresponding to the respective quantities of horizontal and vertical high-frequency components of the object in an image plane; a lens driving mechanism for driving the lens system; and a control unit for controlling the lens driving mechanism according to the two focus signals to focus the lens system. Preferably, the apparatus further includes: a detector for detecting the condition of the object or the viewing conditions and a changeover circuit for changing over the characteristics of the signal processing circuit on the basis of the output of the detector. The additional use of information about the vertical direction enables the focusing of the lens system for any object including a horizontal line. Since the characteristics of the signal processing circuit are changed selectively according to the condition of the object or the viewing conditions, a stable and accurate focusing operation can be achieved regardless of the variation of the condition of the object.

14 Claims, 8 Drawing Sheets

AUTOMATIC FOCUSING APPARATUS

BACKGROUND OF THE INVENTION

1. Field of the Invention

The present invention relates to an automatic focusing apparatus for a video camera.

2. Description of the Prior Art

Various automatic focusing apparatus for video cameras have been proposed and put to practical use. Among those known automatic focusing apparatus, an automatic focusing apparatus of a system which uses the output signals of the image pickup element of the video camera, namely, an automatic focusing apparatus of a so-called "In-focus control servo system" is disclosed, for example, in Ishida et al., "Automatic Focusing of a Television Camera on an In-Focus Control Servo System", NHK Gijutsu Kenkyu Hokoku, Vol. 17, No. 1, p.21.

An example of the conventional automatic focusing apparatus which uses image signals for focusing the lens system of a video camera will be described hereinafter.

In this conventional automatic focusing apparatus, the output signal of an image pickup element is transmitted through a high-pass filter to a rectifier. The output signal of the rectifier is applied to a differential hold circuit. The output signal of the differential hold circuit is amplified by a servo amplifier. A motor for driving a focusing mechanism for focusing a lens system is driven by the output of the servo amplifier.

In operation, the image of an object focused on the image pickup element by a lens system is converted into a corresponding electrical image signal, and then the electrical image signal is supplied to the high-pass filter. The rectifier rectifies the high-frequency component of the electrical image signal filtered by the high-pass filter, and then provides an output signal (hereinafter referred to as a "focus voltage signal") proportional to the high-frequency component of the electrical image signal. The differential hold circuit holds the focus signal for a predetermined time period to obtain a difference between the successive focus signals, and then provides a focus voltage variation signal representing the rate of variation of the focus voltage with time. The focus voltage reaches a maximum when the lens system is focused and decreases with the deviation of the lens system from a position where the image is in focus, and hence the focus voltage curve is a generally upward convex curve having a peak point. When the output signal of the differential hold circuit is positive, the focus voltage is ascending along the focus voltage curve, and hence the motor is driven so that the the focusing ring is turned further in the same direction and the focusing ring is stopped when the focus voltage variation signal is equal to zero. When the output signal of the differential hold circuit is negative, the focus voltage is descending along the focus voltage curve, and hence the motor is driven so as to turn the focusing ring in the reverse direction. Thus, the output of the differential hold circuit is supplied after being amplified by the servo amplifier to a motor driving circuit to drive the motor so that the focusing ring is turned accordingly for focusing.

The conventional automatic focusing apparatus of such a constitution, however, executes a signal processing operation only with respect to the horizontal direction of an image plane, and hence, in some cases, the automatic focusing apparatus is unable to focus the taking lens system on a horizontally invariable object, such as a horizontal line.

In viewing an insufficiently illuminated object or an object having a low reflectance, only a focus voltage of a low level is available, which is insufficient for a focusing operation. Furthermore, the focus voltage curve is also dependent on the f number and focal length of the lens system. For those reasons, the automatic focusing apparatus is unable to function stably for a focusing operation.

Thus, the conventional automatic focusing apparatus is unable to function stably because the focusing operation of the conventional automatic focusing apparatus is susceptible to the spatial frequency component of the object, the condition of the object or the viewing conditions.

SUMMARY OF THE INVENTION

Accordingly, it is an object of the present invention to provide an automatic focusing apparatus capable of generating a focus signal corresponding to the type of object, the condition of an object or the viewing conditions and capable of performing a constantly stable focusing operation.

To achieve the object, the present invention provides an automatic focusing apparatus comprising: a lens system; an element for the photoelectric conversion of an image of an object formed by the lens system; a horizontal filter for extracting a horizontal high-frequency signal component from an output signal of the element; a vertical filter for extracting a vertical high-frequency signal component from the output signal of the element; rectifiers for rectifying respective output signals of the horizontal filter and the vertical filter; a lens driving mechanism for driving the lens system; a driving circuit for driving the lens driving mechanism; and a control unit connected to the driving circuit for providing a control signal to control the lens driving mechanism according to output signals of the rectifiers. Preferably, the automatic focusing apparatus further comprises a detecting means for detecting the condition of the object and the viewing conditions, and a switching means for switching the characteristics of at least either the horizontal filter or the vertical filter according to an output signal of the detecting means.

Thus, the automatic focusing apparatus of the present invention is able to reflect the data of the vertical direction of an image plane on the focus signal. Accordingly, the lens system can be focused on an object on which the conventional automatic focusing apparatus is unable to focus the lens system, such as a horizontal line. Furthermore, since an increased quantity of data is obtained from an object having data both in the horizontal and vertical directions, the possible focusing range of the automatic focusing apparatus is expanded for such an object.

Still further, since appropriate characteristics of the horizontal and vertical filters can be selected on the basis of the results of detection of the condition of the object or the viewing conditions, the automatic focusing apparatus is capable of functioning stably for highly accurate focusing regardless of the variation of the conditions of the object.

DESCRIPTION OF THE PREFERRED EMBODIMENTS

Figure 1:
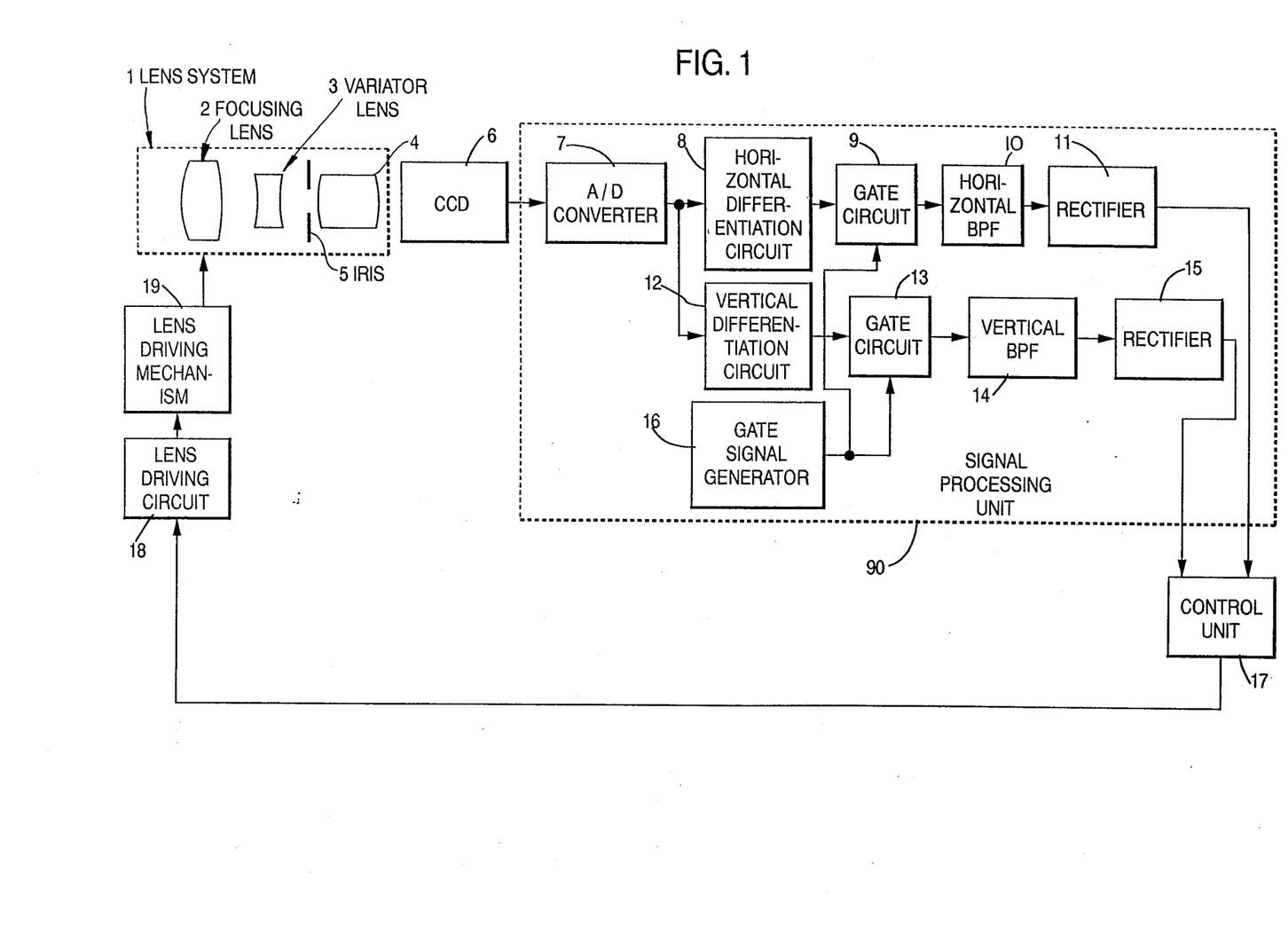
FIG. 1 is a block diagram of an automatic focusing apparatus of a first embodiment according to the present invention.

Referring to FIG. 1 showing an automatic focusing apparatus of a first embodiment according to the present invention, a lens system 1 (for a video camera, the lens system in general has a zoom function) comprises a focusing lens 2 capable of focus adjustment, a variator lens 3 capable of varying magnification, a master lens 4 capable of image formation, and a diaphragm or iris 5. Element 6 is a charge-coupled device (hereinafter abbreviated as "CCD"). A signal processing unit 90 provides focus signals corresponding to the respective quantities of the horizontal and vertical high-frequency components of an object. The signal processing unit 90 comprises an A/D converter 7, a horizontal differentiation circuit 8, a gate circuit 9, a horizontal BPF 10, a rectifier 11, a vertical differentiation circuit 12, a gate circuit 13, a vertical BPF 14, a rectifier 15 and a gate signal generator 16. The output signal of the CCD 6 is fed to the A/D converter 7. The output of the A/D converter 7 is transferred to a control unit 17 through the horizontal differentiation circuit 8, the gate circuit 9, the horizontal BPF 10 and the rectifier 11, and also through the vertical differentiation circuit 12, the gate circuit 13, the vertical BPF 14 and the rectifier 15 to the control unit 17. The gate circuits 9 and 13 are connected to the output terminal of the gate signal generator 16. The output of the control unit 17 is supplied to a lens driving circuit 18 which in turn drives a lens driving mechanism 19.

In operation, the image of an object formed on the CCD 6 by the lens system 1 is converted into a corresponding electrical signal by the CCD 6, and then the electrical signal is supplied to the A/D converter 7. Then, the A/D converter 7 converts the electric signal into a corresponding digital signal, and the horizontal differentiation circuit 8 removes the DC component of the digital signal.

Figure 2:
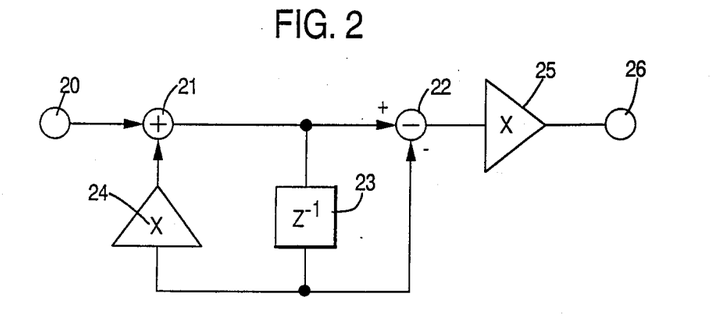
FIG. 2 is a circuit diagram of a horizontal differentiation circuit incorporated into the automatic focusing apparatus of FIG. 1.
Figure 8A:
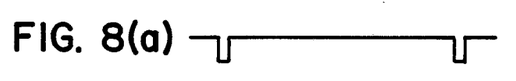
FIGS. 8(a) to 8(g) are waveform charts showing the waveforms of output signals of the components of the automatic focusing apparatus of FIG. 1.
Figure 8B:
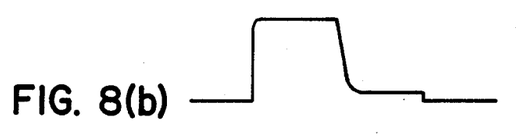
Figure 8C:
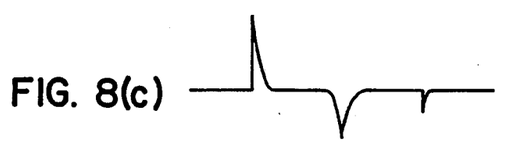
Figure 8D:
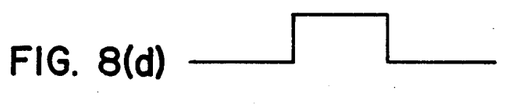

Referring to FIG. 2, the horizontal differentiation circuit 8 comprises an input terminal 20, an adder 21, a subtractor 22, a unit clock delay element 23, constant multipliers 24 and 25 for multiplying input signals by constants and an output terminal 26. When the clock rate of a clock supplied to the horizontal differentiation circuit 8 is 14.31818 MHz and the constants for the constant multipliers 24 and 25 are 0.875 and 0.9375, respectively, the horizontal differentiation circuit 8 functions as a high-pass digital filter having a cut-off frequency $f_c$ of about 300 kHz and a gain of 0 dB. FIG. 8(a) is a horizontal synchronizing signal for the camera; FIG. 8(b) is the output signal of the A/D converter 7 and FIG. 8(c) is an output signal which appears at the output terminal 26. The differential waveforms of FIG. 8(c) corresponding to the leading edge and the trailing edge of the image output are unnecessary for focusing. Therefore, the gate signal generator 16 provides a gate signal for extracting only the central portion of the image plane to remove these unnecessary;, signals. A horizontal gate signal shown in FIG. 8(d) is supplied to the gate circuit 9, and then the gate circuit 9 provides a signal shown in FIG. 8(e). Since the input gate signal supplied to the gate circuit 9 is a digital signal, the gate circuit 9 may be a simple AND circuit. The output signal of the gate circuit 9 is supplied to the horizontal BPF 10.

Figure 3:
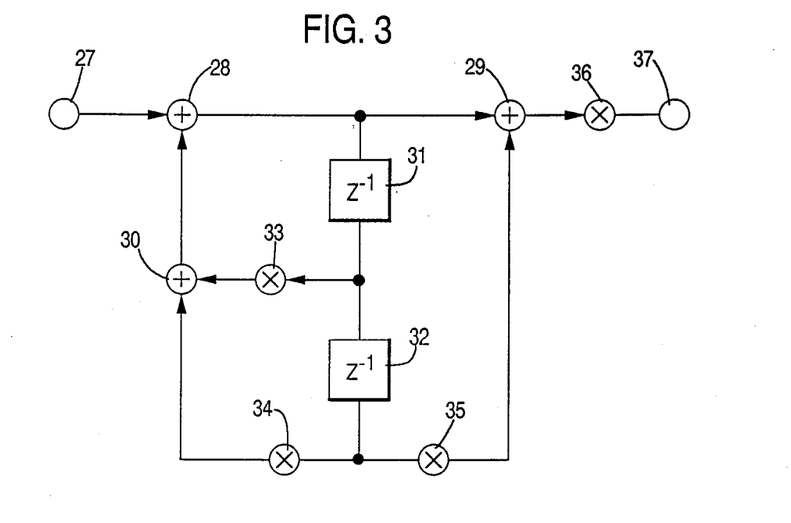
FIG. 3 is a circuit diagram of a horizontal band-pass filter (hereinafter abbreviated as a "BPF") incorporated into the automatic focusing apparatus of FIG. 1.
Figure 8E:
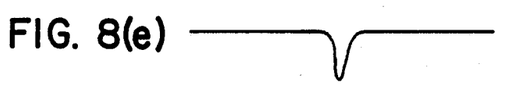
Figure 8F:
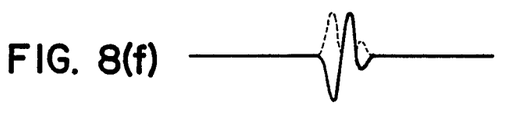

Referring to FIG. 3, the horizontal BPF 10 is a duplex secondary digital band-pass filter comprising an input terminal 27, an output terminal 37, adders 28, 29 and 30, constant multipliers 33, 34, 35 and 36 for multiplying input signals by constants, and unit clock delay elements 31 and 32. When an input signal shown in FIG. 8(e) is supplied to the input terminal 27, an output signal indicated by a continuous line in FIG. 8(f) appears at the output terminal 37. The amplitude of this output signal corresponds to the quantity of a high-frequency signal component contained in a signal representing an object, necessary for focusing. The output signal of the horizontal BPF 10 is supplied to the rectifier 11.

Figure 4:
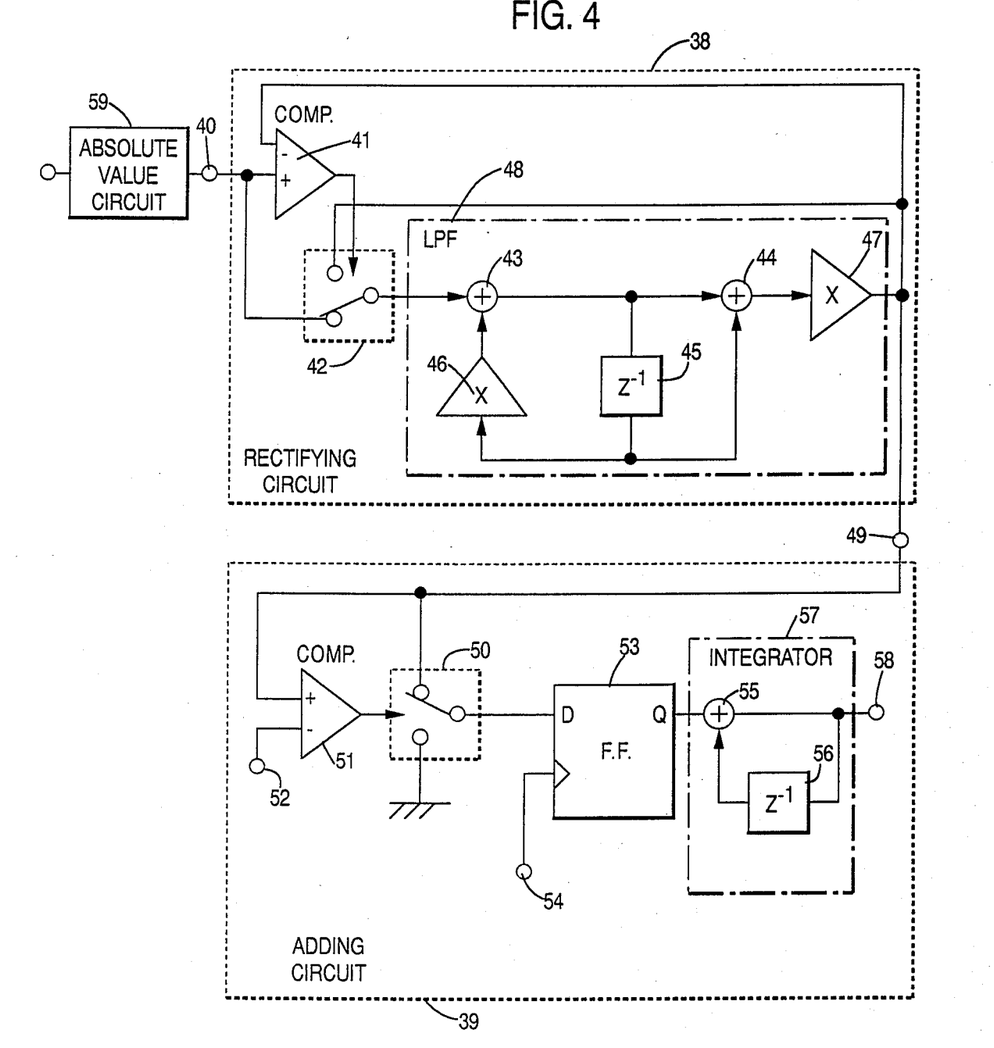
FIG. 4 is a circuit diagram of a rectifier incorporated into the automatic focusing apparatus of FIG. 1.

Referring to FIG. 4, the rectifier 11 comprises an absolute value circuit 59, a rectifying circuit 38 and an adding circuit 39. The rectifying circuit 38 comprises an input terminal 40, a comparator 41 having one input terminal connected to the input terminal 40, a switching circuit 42 having one input terminal connected to the input terminal 40, a low-pass filter 48 comprising adders 43 and 44, a unit clock delay element 45 and constant multipliers 46 and 47 for multiplying input signals by constants, and an output terminal 49. The output terminal of the constant multiplier 47 is connected to one of the input terminals of the comparator 41 and to the other input terminal of the switching circuit 42. The switching circuit 42 changes the input to the adder 43 according to the output of the comparator 41. The output of the rectifying circuit 38 is supplied via the output terminal 49 to the adding circuit 39. The adding circuit 39 comprises a switching circuit 50, a comparator 51, an input terminal 52, a D-flip-flop 53, a terminal 54, an integrator 57 comprising an adder 55 and a unit clock delay element 56, and an output terminal 58. The output of the detecting circuit 38 is transferred through the output terminal 49 to the switching circuit 50 and the comparator 51 of the adding circuit 39. A signal of a predetermined level is supplied to the input terminal 52. The signal supplied to the input terminal 52 is compared with the output of the rectifying circuit 38 by the comparator 51, and the switching circuit 50 is controlled by the output of the comparator 51. Actually, a plurality of D-flip-flops are provided and the number of the D-flip-flops corresponds to the number of bits of the signal to be processed. The data holding timing of the D-flip-flop 53 for holding the output data of the switching circuit 50 is determined by a horizontal synchronizing signal supplied to the terminal 54. An adder 55 and a unit clock delay element 56 which is a recursive delay element the output of which is fed back to the input together constitute an integrator 57. The frequency of the clock supplied to the delay element 56 is synchronous with the horizontal synchronizing signal.

The operation of the rectifier 11 thus constituted will be described hereinafter.

Figure 8G:
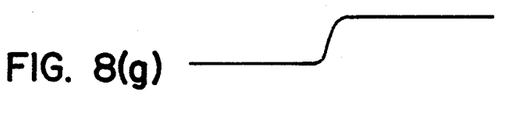

An absolute value circuit 59 applies the absolute value of an input signal supplied to the rectifier 11 to the input terminal 40. Since the contact of the switching circuit 40 connected to the input terminal 40 is closed, the input signal is transferred to the low-pass filter 48. The output of the low-pass filter 48 is compared with the input signal by the comparator 41. When the output signal is greater than the input signal, the comparator 41 provides an output to close the contact of the switching circuit 42 connected to the output terminal of the low-pass filter 48, so that the output of the low-pass filter 48 is held. This operation is continued during a horizontal scanning period. Consequently, a peak value of a band in one line of the image signal limited by the low-pass filter 48 is held. The low-pass filter 48 removes high-frequency noise, which is different from the function of a simple peak value holding circuit. The rectifying circuit 38 is reset by a horizontal synchronizing signal and starts the rectification cycle for the next line. The waveform of the output signal of the rectifying circuit 38 is shown in FIG. 8(g).

The peak value in one line of the image signal thus held is supplied to the adding circuit 39. A value corresponding to an output level of the rectifying circuit 38 when only a noise component (hereinafter referred to as "noise level") is supplied to the same is supplied to the input terminal 52 of the comparator 51. The comparator 51 and the switching circuit 50 inhibit the application of the input signal supplied to the adding circuit 39 to the integrator 57 when the level of the input signal is lower than the noise level. When the level of the input signal to the adding circuit is higher than the noise level, the D-flip-flop 53 makes the integrator 57 execute integration for each line to obtain an integral of the input signals for one field period. The integral appears at the output terminal 58. The adding circuit 39 is reset by a vertical synchronizing signal to start the operation for the next field.

Since signals of a level below the noise level are removed even if the object has high-frequency signal components only in several lines on an image plane, such as a fly on a white wall, only the signals for lines including high-frequency signal components are added and an output can be obtained without being removed together with noise. The level of a signal spanning n lines is multiplied by n because the signal is added n times by the integrator 57, whereas the noise is multiplied merely by $\sqrt{n}$. Accordingly, the SN ratio of the output signal of the adding circuit 39 is improved. In the first embodiment, digital signals corresponding to the image signals are processed, and hence peak values are held without fail. Furthermore, the line signals can be achieved by means of a very simple construction. Thus, the rectifier 11 provides the horizontal high-frequency signal components of the image plate.

Figure 5:
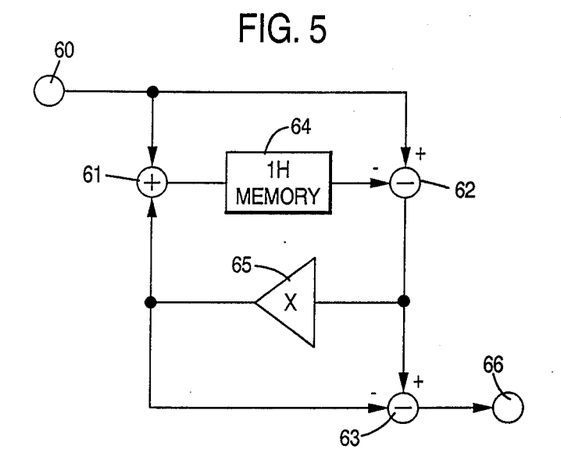
FIG. 5 is a circuit diagram of a vertical BPF incorporated into the automatic focusing apparatus of FIG. 1.

Operation for obtaining the vertical high-frequency signal components will be described hereinafter. Basically, the mode of operation for obtaining the vertical high-frequency signal components is the same as that for obtaining the horizontal high-frequency signal components, except that a filter circuit is used for obtaining the vertical high-frequency signal components. Referring to FIG. 5, the vertical BPF 14 comprises an input terminal 60, an adder 61, subtractors 62 and 63, a one-scanning-period delay element 64, such as a first-in first-out circuit (hereinafter abbreviated as "FIFO"), a constant multiplier 65 and an output terminal 66. The constant multiplier 65 multiplies an input signal by a constant. Suppose that the constant k for the constant multiplier 65 is $-0.75$, Then, vertical cut-off frequency $f_c = 12$ TV line resolution for a television signal of the NTSC system. Thus, the vertical BPF 14, similarly to the horizontal differentiation circuit 8, functions as a filter for removing the vertical DC components. When $k = +0.75$, the vertical cut-off frequency $f_c = 120$ TV line resolution, and the vertical BPF 14 functions, similarly to the horizontal BPF 10, as a filter for extracting the high-frequency signal components of the object, necessary for focusing.

The vertical filter thus constituted processes vertical signals. The constant k for the constant multiplier 65 (FIG. 5) of the vertical differentiation circuit 12 (FIG. 1) is $-0.75$. High-frequency signal components included in the starting and ending portions of an effective vertical scanning period in a signal produced by removing dc components by the vertical differentiation circuit 12 are not the high-frequency signal components of the object. Therefore, the gate circuit 13 executes AND operation on the basis of the output signal of the vertical differentiation circuit 12 and the output signal of the gate signal generator 16 to extract only signal components corresponding to the central portion of the image plane and to eliminate signal components corresponding to unnecessary portions of the image plane. Desired frequency components are extracted from the output signal of the gate circuit 13 by the vertical BPF 14 having the constant multiplier 65 which multiplies the constant $k = +0.75$, the frequency component extracted by the vertical BPF is rectified by the rectifier 15. The rectifier 15 is similar to the rectifier 11 in construction. The rectifier 15 extracts the vertical high-frequency signal components of the object in each field period.

The outputs of the rectifiers 11 and 15 are supplied to the control unit 17, and then the control unit 17 provides a control signal to control the lens driving circuit 18 which in turn drives the lens driving mechanism 19. Practically, the lens driving mechanism 19 is a motor for driving the focusing lens 2.

Figure 6:
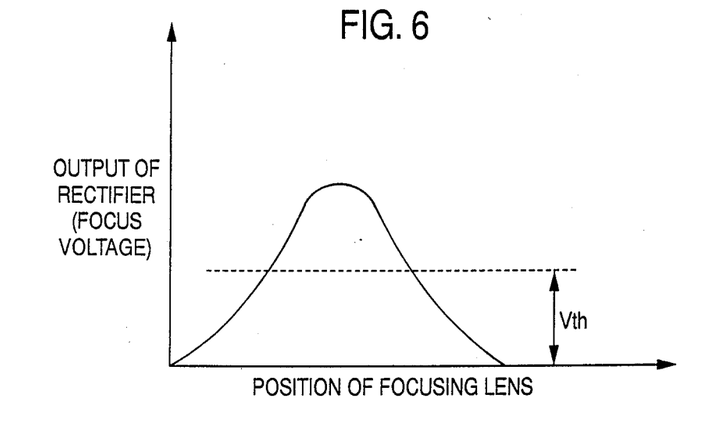
FIG. 6 is a graph showing the variation of focus voltage with the position of a focusing lens.

The control unit 17, for example, is a microcomputer. The operation of the control unit 17 will be described with reference to FIGS. 6 and 7. The outputs of the rectifiers 11 and 15 are added by a microcomputer to obtain a focus voltage. FIG. 6 is a curve showing the variation of the focus voltage with the deviation of the position of the focusing lens 2 of the lens system 1, in which the position of the focusing lens 2 is measured on the horizontal axis, and the focus voltage, i.e., the sum of the outputs of the rectifiers 11 and 15 on the vertical axis. When the lens system 1 is focused, the focus voltage reaches the maximum level. The level of the focus voltage decreases as the degree of unfocused state of the taking lens system 1 increases, hence, the curve has a generally upward convex shape having a peak point.

Figure 7:
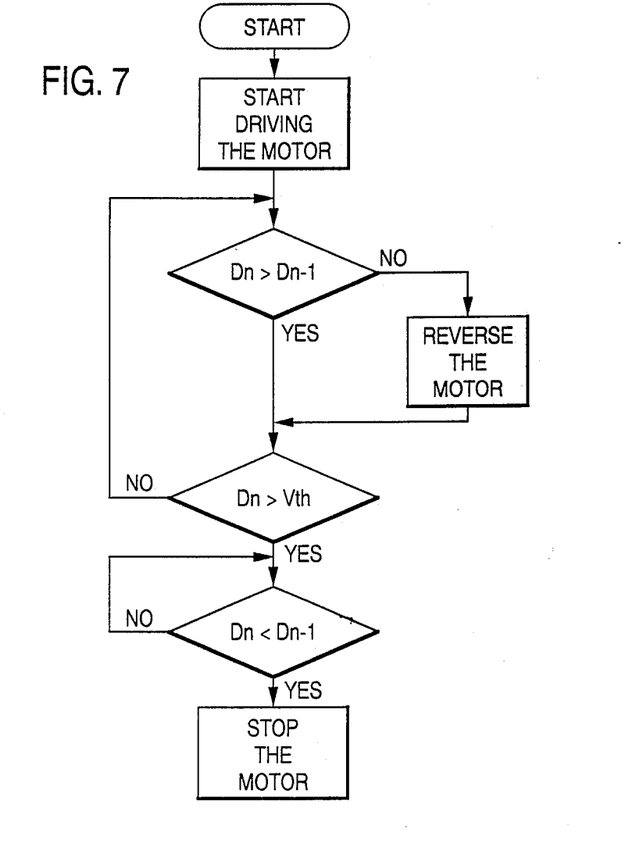
FIG. 7 is a flow chart showing the operation of a control unit incorporated into the automatic focusing apparatus of FIG. 1.

In FIG. 7, Dn represents a focus voltage for the nth field, and Dn−1 represents a focus voltage for the (n−1)th field. Upon the start of the focusing operation, first the motor is driven for rotation in an optional direction, and then Dn and Dn−1 are compared with each other. When Dn>Dn−1, the focus voltage is ascending along the curve of FIG. 6. In this state, the motor is driven continuously. When Dn<Dn−1, the motor is reversed. Then, Dn is compared with a predetermined level Vth. When an inequality Dn>Vth is satisfied, the focus voltage is near the peak point of the curve of FIG. 6. When Dn<Dn−1, the focus voltage has moved past the peak point, and hence the motor is stopped. Thus, the taking lens system 1 is brought into focus through the focusing operation.

Since the automatic focusing apparatus in the first embodiment according to the present invention comprises the horizontal BPF for extracting the horizontal high-frequency components from the output of the pickup element, the vertical BPF for extracting the vertical high-frequency components from the output of the pickup element, the rectifiers for rectifying the outputs of the horizontal and vertical BPFs, the control unit which provides control signals to control the lens driving mechanism for driving the taking lens system or the focusing lens unit of the taking lens system, and the driving circuit for driving the lens driving mechanism according to the control signals provided by the control unit, the automatic focusing apparatus carries out the focusing operation on the basis of the focus voltage signal including the vertical data of the image plane in addition to the horizontal data of the same. Accordingly, the automatic focusing apparatus of the present invention is able to focus the taking lens system on an object, such as a horizontal line, for which the conventional automatic focusing apparatus are unable to focus the taking lens system. Since an increased quantity of information is available for focusing the taking lens system on an object having information for both the horizontal and vertical directions, the possible focusing range is expanded.

Furthermore, the detecting circuit which limits the band, and the adding circuit which eliminates the noise components and adds the signal components reduce the noise components in the focus voltage, which enables stable focusing operation.

Figure 9:
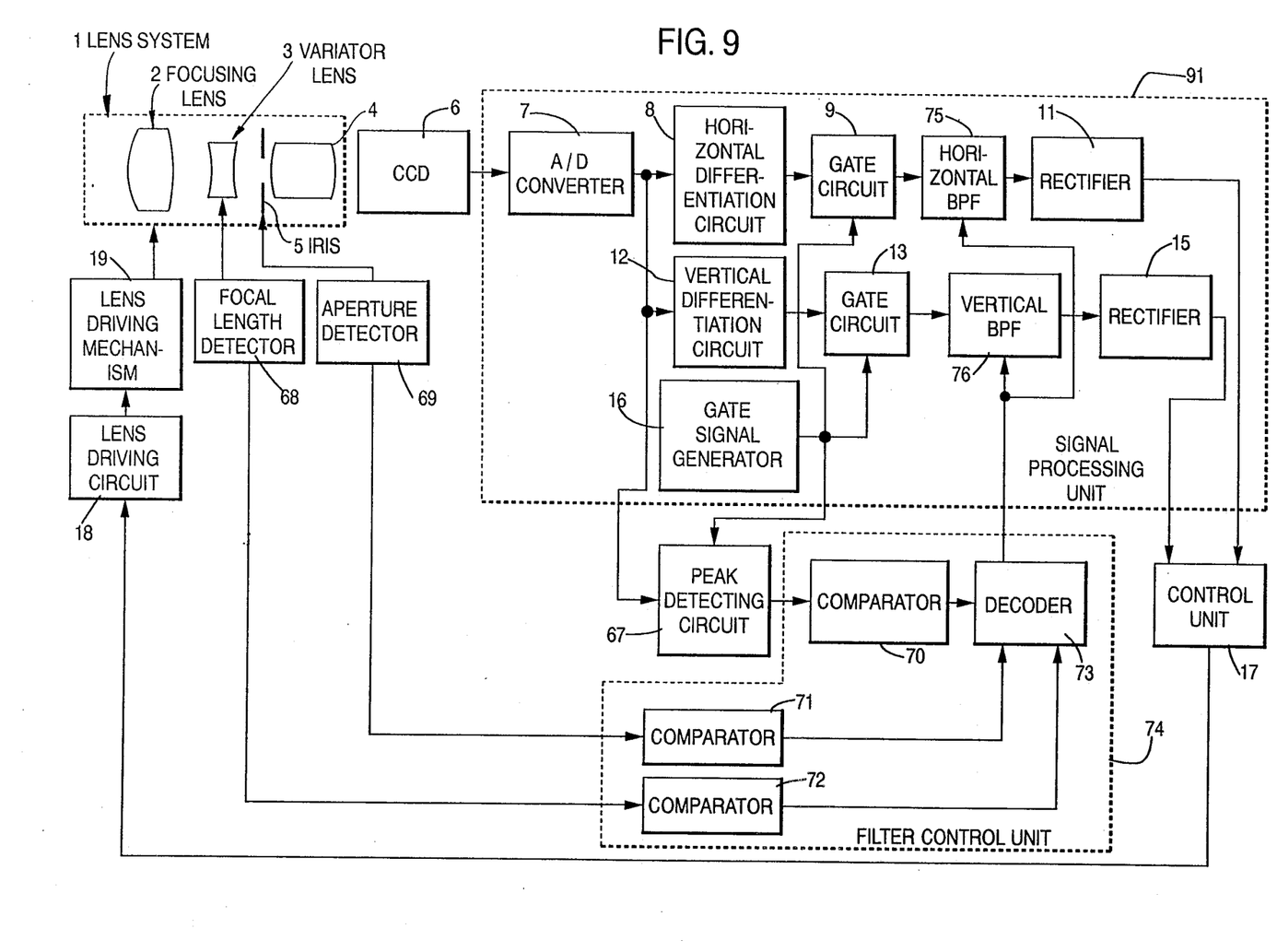
FIG. 9 is a block diagram of an automatic focusing apparatus of a second embodiment according to the present invention.

An automatic focusing apparatus of a second embodiment according to the present invention will be described hereinafter. In FIG. 9, parts corresponding to those previously described with reference to FIG. 1 are denoted by the same reference numerals. The automatic focusing apparatus of the second embodiment is different from the automatic focusing apparatus of the first embodiment shown in FIG. 1 in that a peak detecting circuit 67, a focal length detector 68 and an aperture detector 69 are provided to detect the condition of the object, and a filter control unit 74 is provided to change the characteristics of filters for extracting high-frequency signal components, on the basis of the output signals of the peak detecting circuit 67, the focal length detector 68 and the aperture detector 69.

Basically, a horizontal BPF 75 and a vertical BPF 76 are the same in constitution as the horizontal BPF 10 (FIG. 3) and the vertical BPF (FIG. 5), respectively. However, the constants k set for the constant multipliers of the horizontal BPF 75 and the vertical BPF 76 are changed selectively by the filter control unit 74 to vary the cut-off frequencies of the horizontal BPF 75 and the vertical BPF 76. In the vertical BPF 76, for example, cut-off frequency is 48 TV line resolution (600 kHz with respect to horizontal direction) when k=0.25, 96 TV line resolution (1.2 MHz) when k=0.5, and 120 TV line resolution (1.5 MHz) when k =0.75.

The filter control unit 74 comprises comparators 70, 71 and 72 for respectively comparing the outputs of the peak detecting circuit 67, the aperture detector 69 and the focal length detector 68 with respective predetermined levels, and a decoder which provides filter control signals on the basis of the outputs of the comparators 70, 71 and 72.

Figure 11:
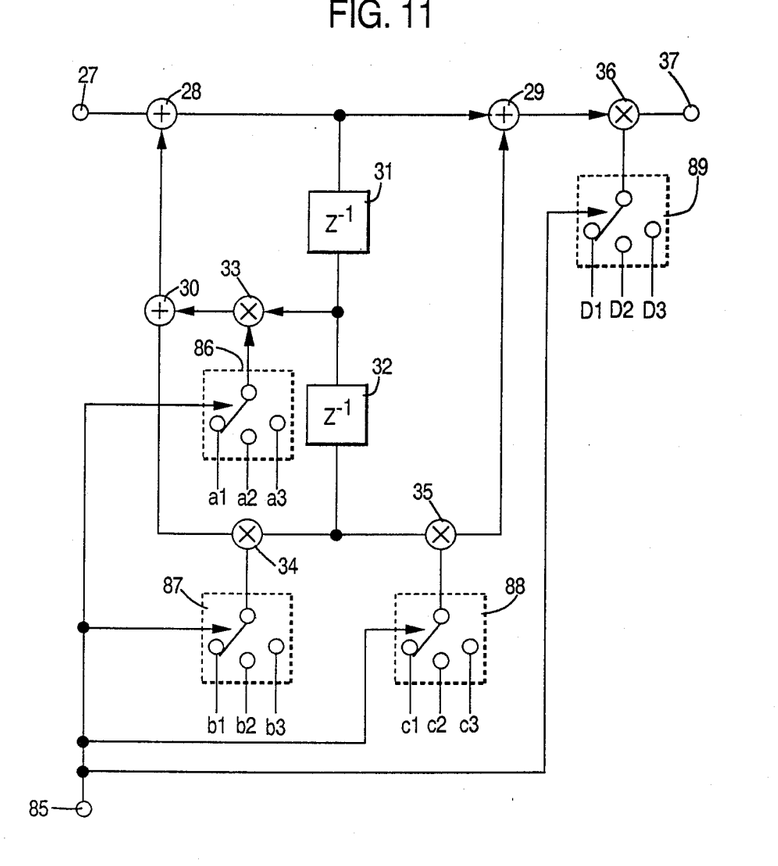
FIG. 11 is a circuit diagram of a horizontal BPF incorporated into the automatic focusing apparatus of FIG. 9.

The horizontal BPF 75 is provided, in addition to the components of the horizontal BPF 10 shown in FIG. 3, with constant selectors 86, 87, 88 and 89 for respectively selectively changing constants for constant multipliers 33, 34, 35 and 36. A constant selector control signal is supplied to an input terminal 85 connected to the output terminal of the filter control unit 74 (FIG. 9). The constant selector 86 selects a constant a1, a2 or a3 in accordance with the control signal supplied to the input terminal 85.

The operation of the automatic focusing apparatus thus constituted will be described hereinafter.

Figure 10:
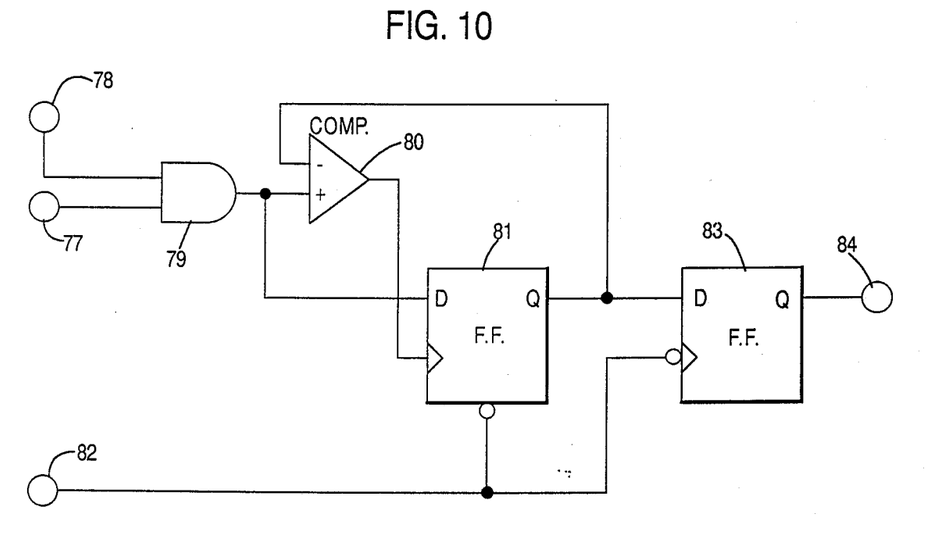
FIG. 10 is a circuit diagram of a peak detecting circuit incorporated into the automatic focusing apparatus of FIG. 9.

First a method of detecting the luminance of the object, namely, one of the conditions of the object, will be described. Referring to FIG. 10, the peak detecting circuit 67 comprises an input terminal 77 to which the output signal of an A/D converter 7 (FIG. 9) is supplied, an input terminal 78 to which the output signal of a gate signal generator 16 (FIG. 9) is supplied, an AND circuit 79, a digital comparator 80, D-flip-flops and 83 (actually, a plurality of D-flip-flops 81 and a plurality of D-flip-flops 83 are provided and the number of the D-flip-flops 81 and that of the D-flip-flops 83 correspond to the number of bits of the signal), an input terminal 82 to which a vertical synchronizing signal is supplied, and an output terminal 84. The output of the AND circuit 79 is a signal representing a portion for focusing extracted from an image plane. The output of the AND circuit 79 is supplied to one of the input terminals of the digital comparator 80 and to the D-flip-flop 81. The clock terminal of the D-flip-flop 81 is connected to the output terminal of the digital comparator 80. The output of the digital comparator 80 is HIGH when the output signal of the AND circuit 79 is high. At the leading edge of the output of the digital comparator 80, the output of the AND circuit 79 is latched by the D-flip-flop 81. The output terminal of the D-flip-flop 81 is connected to the other input terminal of the digital comparator 80, and hence the output terminal of the D-flip-flop 81 holds the maximum output of the AND circuit 79. On the other hand, the D-flip-flop 81 is reset by a vertical synchronizing signal supplied to the input terminal 82, and the D-flip-flop 83 latches data. Consequently, the maximum output of the AND circuit 79 in one field appears at the output terminal 84. Since the input signal of the AND circuit 79 is not processed by a differentiation circuit, the input signal contains the DC component of an image signal. Accordingly, the maximum output of the AND circuit 79 corresponds to the maximum value of the image signal representing a portion of the object having the maximum luminance.

Thus, the peak detecting circuit 67 provides the maximum level of luminance of the object in a region extracted by the AND circuit 79.

The output of the peak detecting circuit 67 is compared with a predetermined value by the comparator 70. When the output of the peak detecting circuit 67 is smaller than the predetermined value, it is determined that the object is a low luminance object, and then the decoder 73 provides an output signal to shift the respective passbands of the horizontal BPF 75 and the vertical BPF 76 to the lower side. Generally, in the frequency spectrum of an image signal, the amplitude decreases with an increase in the frequency. Therefore, the shift of the passband to the lower side increases the level of the output. Accordingly, a focus voltage of a sufficiently high level can be secured to enable a focusing operation even for a low luminance object.

When the passband of the BPF is high, the level of the focus voltage is low, while the curve indicating the variation of the focus voltage with the deviation of the position of the focusing lens has a sharp shape, and hence focusing accuracy is improved. When the passband of the BPF is low, the level of the focus voltage is high, while the curve has a comparatively flat upward convex shape, and hence focusing accuracy is deteriorated.

When the luminance of the object is comparatively high, the BPF is set for a high passband to focus the lens system at a high accuracy. When the luminance of the object is comparatively low, the range of detection of the unfocused condition of the lens system is wide because the image signal contains only a small quantity of high-frequency components. Accordingly, the passband is shifted to the lower side to raise the level of the focus voltage. Thus, a stable focusing operation can be achieved even if the luminance of the object is low.

A method of focusing the lens system 1 through the detection of the focal length and aperture of the lens system 1 will be described hereinafter. First the influence of the f number and the variation of the focal length on the shape of the focus voltage curve will be explained. The depth d of focus of the lens system 1 is expressed by $$d = F \times \delta \quad (1)$$

where F is the f number, and δ is an allowable diameter of circle of confusion.

The depth d of focus is the range of distance of the image behind the lens system 1 through which the image has acceptable sharpness and is proportional to the f number of the lens system 1. On the other hand, since the focus voltage curve indicates the relationship between the minuteness of the image plane and the degree of unfocused state, the gradient of the focus voltage curve is approximately proportional to the f number, namely, the gradient decreases with an increase in the f number.

The relationship between the movement a of the focusing lens 2 of the lens system 1 along the optical axis, and the variation s of position of image formation is expressed approximately by $$s = k \times a \times (f/f_t)^2 \quad (2)$$

where f is the focal length of the lens system 1, $f_t$ is the maximum focal length of the lens system 1 in its telephoto setting, and k is a proportional constant. Therefore, the gradient of the focus voltage curve is proportional to the square of the variation of the focal length of the lens system 1, and decreases with the decrease of the focal length.

Thus, the gradient of the focus voltage curve is greatly dependent on the f number and the variation of the focal length. If the shape of the focus voltage curve varies greatly, it is impossible to secure a sufficiently high focusing accuracy, and the response speed of focusing operation is decreased; that is, the focus voltage curve is gentle and the variation of the focus voltage between fields is small when the aperture of the lens system 1 is small or when the focal length is small, and hence the sensitivity of detection is deteriorated.

The focal length of the lens system 1 is varied by shifting the variator lens 3. Accordingly, the focal length detector 68 detects the position of the variator lens 3. A rheostat comprising a resistor, and a slider attached to the variator lens 3 so as to slide along the resistor may be provided to detect the position of the variator lens 3, namely, the focal length of the lens system 1, in the form of voltage.

The aperture detector 69 detects a signal corresponding to the diameter of the diaphragm 5, namely, the f number of the taking lens system 1. An ordinary video camera is provided with an automatic diaphragm adjusting mechanism which is driven by a motor to adjust the diaphragm. Therefore, the aperture detector 69 detects the phase of the rotor of the motor. For example, the aperture detector 69 is provided with a Hall element to detect the phase of the rotor through the detection of the variation of magnetism.

The respective outputs of the focal length detector 68 and the aperture detector 69 are fed to the filter control unit 74, and then the filter control unit 74 selects the characteristics of the horizontal BPF 75 and the vertical BPF 76 on the basis of the outputs of the focal length detector 68 and the aperture detector 69, which is similar to the function of the filter control unit 74 in detecting the luminance of the object.

As mentioned above, the gradient of the focus voltage curve is approximately proportional to the f number. Assuming that the lens system 1 is a low-pass filter, the increase of the f number corresponds to the increase of the cut-off frequency. Accordingly, the shift of the passbands of the horizontal BPF 75 and the vertical BPF 76 to the higher side increases the gradient of the focus voltage curve, and hence the gradient of the focus voltage curve is maintained approximately constant by shifting the passbands to the higher side by the filter control unit 74 according to the output of the aperture detector 69 when the f number is increased. If the gradient of the focus voltage curve is constant, the output signal of the control unit 17 is constant regardless of the f number, so that stable focusing operation is possible at all times.

Similarly, the gradient of the focus voltage curve varies in proportion to the square of the variation of the focal length of the lens system 1 and decreases with the decrease of the focal length. Accordingly, the gradient of the focus voltage curve can be maintained constant by shifting the passbands by the filter control unit 74 according to the output of the focal length detector 68 when the focal length is decreased.

Thus, the provision of the peak detecting circuit, the focal length detector and the aperture detector for detecting the condition of the object, and a filter control unit for selectively changing the characteristics of the BPFs enables a constantly stable focusing operation regardless of the condition of the object. Generally, the number of component parts increases according to the number of necessary pass bands in constructing an analog BPF. However, according to the present invention, since the image signal is converted into a digital signal for processing, the passbands of the BPF (digital BPF) can be changed simply by changing the coefficient of the BPF, which enables a highly accurate automatic focusing apparatus to be constructed in a compact construction by using LSIs.

Although digital signals are processed for a focusing operation in the first embodiment, an improved automatic focusing apparatus can be constructed by additionally providing the conventional automatic focusing apparatus with a vertical filter capable of extracting the vertical frequency component of an analog signal.

Furthermore, although the outputs of the rectifiers 11 and 15 are added by the control unit 17 in the preferred embodiments, the sum of the outputs of the horizontal and vertical BPFs may be fed to a single rectifier so as to allow the elimination of one of the rectifiers 11 and 15. Still further, the control unit 17 may be designed so as to alternately use the outputs of the rectifiers 11 and 15.

Still further, although the constants for the constant multipliers are varied selectively to vary the cut-off frequencies of the BPFs in the second embodiment, the constitution of the BPFs may be changed to vary the cut-off frequencies.

What is claimed is:

1. An automatic focusing apparatus comprising:
   a lens system including a focusing lens unit;
   a photoelectric conversion means for converting an optical image formed by said lens system into a corresponding electrical output signal;
   a signal processing means for generating first and second focus signals respectively corresponding to the quantities of horizontal and vertical high-frequency components of a predetermined portion of an image plane on the basis of said output signal of said photoelectric conversion means;
   a lens driving means for driving said focusing lens unit; and
   a control means for controlling said lens driving means according to said first and second focus signals so as to focus said lens system.

2. An automatic focusing apparatus according to claim 1, wherein said signal processing means comprises:
   a horizontal differentiation means for removing a DC component of a horizontal signal included in said output signal of said photoelectric conversion means;
   a gate signal generating means for generating a signal for extracting a central portion of said image plane;
   a first gate means for sampling signals on a time axis from an output of said horizontal differentiation means in response to said signal from said gate signal generating means;
   a horizontal band-pass filter means for extracting a horizontal high-frequency signal component from an output signal of said first gate means;
   a first rectifying means for generating a first focus signal by rectifying an output of said horizontal band-pass filter means;
   a vertical differentiation means for removing a DC component of a vertical signal from said output signal of said photoelectric conversion means;
   a second gate means for sampling signals on a time axis from an output of said vertical differentiation means in response to said signal from said gate signal generating means;
   a vertical band-pass filter means for extracting a vertical high-frequency signal component from an output signal of said second gate means; and
   a second rectifying means for generating a second focus signal by rectifying an output of said vertical band-pass filter means.

3. An automatic focusing apparatus according to claim 2, wherein each of said first and second rectifying means comprises a series connected combination of an absolute value circuit, a rectifying circuit and an adding circuit.

4. An automatic focusing apparatus according to claim 3, wherein said rectifying circuit of each of said first and second rectifying means comprises:
   a low-pass filter;
   a comparator for comparing an output signal of said low-pass filter and an output signal of a corresponding one of said absolute value circuits; and
   a switching means controlled by an output of said comparator for selectively supplying either said output signal of said low-pass filter or said output signal of a corresponding one of said absolute value circuits to said low-pass filter.

5. An automatic focusing apparatus according to claim 3, wherein said adding circuit of each of said first and second rectifying means comprises:
   a comparator for comparing a level of an input signal inputted to said adding circuit with a predetermined level;
   a switching means for selectively providing either said input signal or a signal of a zero level according to an output of said comparator; and
   an integrator for integrating output signals of said switching means.

6. An automatic focusing apparatus comprising:
   a lens system including a focusing lens unit;
   a photoelectric conversion means for converting an optical image of an object formed by said lens system into a corresponding electrical output signal;
   a signal processing means for generating first and second focus signals respectively corresponding to the quantities of horizontal and vertical high-frequency components of a predetermined portion of an image plane on the basis of said output signal of said photoelectric conversion means;
   a detecting means for detecting a condition of the object or a viewing condition;
   a changeover means for selectively changing over characteristics of said signal processing means according to an output of said detecting means;
   a lens driving means for driving said focusing lens unit; and
   a control means for controlling said lens driving means for focusing according to said first and second focus signals.

7. An automatic focusing apparatus according to claim 6, wherein said detecting means includes a focal length detecting means for detecting a focal length of said lens system.

8. An automatic focusing apparatus according to claim 6, wherein said detecting means includes aperture detecting means for detecting an f number of said lens system.

9. An automatic focusing apparatus according to claim 6, wherein said detecting means includes a peak detecting means for detecting a luminance of the object.

10. An automatic focusing apparatus according to claim 6, wherein said signal processing means comprises:
- a horizontal differentiation means for removing a DC component of a horizontal signal included in said output signal of said photoelectric conversion means;
- a gate signal generating means for generating an output signal for extracting a central portion of said image plane;
- a first gate means for sampling signals on a time axis from an output of said horizontal differentiation means in response to said output signal of said gate signal generating means;
- a horizontal band-pass filter means for extracting a horizontal high-frequency signal component from an output signal of said first gate means;
- a first rectifying means for rectifying the output signal of said horizontal band-pass filter means to generate a first focus signal;
- a vertical differentiation means for removing a DC component of a vertical signal included in said output signal of said photoelectric conversion means;
- a second gate means for sampling signals on a time axis from an output of said vertical differentiation means in response to said output signal of said gate signal generating means;
- a vertical band-pass filter means for extracting a vertical high-frequency signal component form an output signal of said second gate means; and
- a second rectifying means for rectifying an output of said vertical band-pass filter means to generate a second focus signal,
wherein characteristics of at least either said horizontal band-pass filter means or said vertical band-pass filter means are changed over selectively by said changeover means.

11. An automatic focusing apparatus according to claim 10, wherein each of said first and second rectifying means comprise a series connected combination of an absolute value circuit, a rectifying circuit and an adding circuit.

12. An automatic focusing apparatus according to claim 11, wherein said rectifying circuit of each of said first and second rectifying means comprises:
- a low-pass filter;
- a comparator for comparing an output signal of said low-pass filter and an output signal of a corresponding one of said absolute value circuits; and
- switching means controlled by an output of said comparator for selectively supplying either said output signal of said low-pass filter or said output signal of a corresponding one of said absolute value circuits to said low-pass filter.

13. An automatic focusing apparatus according to claim 11, wherein said adding circuit of each of said first and second rectifying means comprises:
- a comparator for comparing a level of an input signal inputted to said adding circuit with a predetermined level;
- a switching means for selectively providing either said input signal of said adding circuit or a signal of a zero level according to an output of said comparator; and
- an integrator for integrating output signals of said switching means.

14. An automatic focusing apparatus according to claim 10, wherein the characteristics of said horizontal band-pass filter means or said vertical band-pass filter means are changed by changing coefficients of their respective filter means.

* * * * *